United States Patent
Pederson et al.

(10) Patent No.: US 8,687,965 B2
(45) Date of Patent: Apr. 1, 2014

(54) LED LIGHT DONGLE COMMUNICATION SYSTEM

(75) Inventors: John Pederson, St. Cloud, MN (US); Paul R. Brown, St. Cloud, MN (US); Timothy J. Vogt, Elk River, MN (US)

(73) Assignee: Federal Law Enforcement Development Services, Inc., St. Cloud, MN (US)

( * ) Notice: Subject to any disclaimer, the term of this patent is extended or adjusted under 35 U.S.C. 154(b) by 589 days.

(21) Appl. No.: 12/126,227

(22) Filed: May 23, 2008

(65) Prior Publication Data
US 2008/0320200 A1 Dec. 25, 2008

Related U.S. Application Data

(60) Provisional application No. 60/931,611, filed on May 24, 2007.

(51) Int. Cl.
*H04B 10/00* (2013.01)

(52) U.S. Cl.
USPC ........... 398/135; 398/172; 398/128; 398/130; 398/118

(58) Field of Classification Search
USPC ......... 398/127, 118, 128–131, 135–139, 172, 398/22
See application file for complete search history.

(56) References Cited

U.S. PATENT DOCUMENTS

| | | | |
|---|---|---|---|
| 700,678 A | 5/1902 | Downie | |
| 2,082,279 A | 6/1937 | Fore | |
| 3,469,686 A | 10/1972 | Gutsche et al. | |
| 3,701,043 A | 10/1972 | Zuleeg et al. | |
| 3,705,316 A | 12/1972 | Burrous et al. | |
| 3,863,075 A | 1/1975 | Ironmonger et al. | |
| 3,867,718 A | 2/1975 | Moe | |
| 3,889,147 A | 6/1975 | Groves | |
| 3,911,430 A | 10/1975 | Jankowski et al. | |
| 4,149,111 A | 4/1979 | Coates, Jr. | |
| 4,243,985 A | 1/1981 | Quayle | |

(Continued)

FOREIGN PATENT DOCUMENTS

| | | |
|---|---|---|
| AU | 2006201345 | 10/2007 |
| AU | 2007202909 | 2/2008 |

(Continued)

OTHER PUBLICATIONS

Komine T. Et Al., "Integrated System of White LED Visible-Light Communication and Power-Line Communication," 20020915; 20020915-20020918, vol. 4, Sep. 15, 2002, pp. 1762-1766.

(Continued)

*Primary Examiner* — Daniel Washburn
*Assistant Examiner* — Hibret Woldekidan
(74) *Attorney, Agent, or Firm* — Vidas, Arrett & Steinkraus, P.A.

(57) ABSTRACT

A Universal Serial Bus (USB) dongle may include an optical transceiver having a USB inter face for engagement to an electronic device such as a laptop computer or other USB-configured device. The USB dongle may include a converter or buffering, isolation, modulation or amplification circuitry. The USB dongle sends and receives data signals which may be carried upon an optical transmission as generated by an LED light source which in turn is in communication with a host device such as a network processor. The USB dongle may also include operational amplifiers (op-amps) and transistor amplifiers.

9 Claims, 1 Drawing Sheet

(56) References Cited

U.S. PATENT DOCUMENTS

| | | |
|---|---|---|
| 4,254,453 A | 3/1981 | Mouyard et al. |
| 4,271,408 A | 6/1981 | Teshima et al. |
| 4,298,806 A | 11/1981 | Herold |
| 4,301,461 A | 11/1981 | Asano |
| 4,319,306 A | 3/1982 | Stanuch |
| 4,336,580 A | 6/1982 | Mouyard et al. |
| 4,342,944 A | 8/1982 | SpringThorpe |
| 4,368,979 A | 1/1983 | Ruell |
| 4,390,931 A | 6/1983 | Gorick et al. |
| 4,434,510 A | 2/1984 | Lemelson |
| 4,445,132 A | 4/1984 | Ichikawa et al. |
| 4,556,862 A | 12/1985 | Meinershagen |
| 4,595,904 A | 6/1986 | Gosswiller et al. |
| 4,598,198 A | 7/1986 | Fayfield |
| 4,614,866 A | 9/1986 | Liss |
| 4,615,131 A | 10/1986 | Wakatake |
| 4,616,225 A | 10/1986 | Woudenberg |
| 4,630,180 A | 12/1986 | Muraki et al. |
| 4,630,183 A | 12/1986 | Fujita |
| 4,633,280 A | 12/1986 | Takasu |
| 4,654,629 A | 3/1987 | Bezos et al. |
| 4,703,219 A | 10/1987 | Mesquida |
| 4,710,977 A | 12/1987 | Lemelson |
| 4,716,296 A | 12/1987 | Bussiere et al. |
| 4,720,835 A | 1/1988 | Akiba et al. |
| 4,724,312 A | 2/1988 | Snaper |
| 4,742,432 A | 5/1988 | Thillays et al. |
| 4,799,135 A | 1/1989 | Inukai et al. |
| 4,821,118 A | 4/1989 | Lafreniere |
| 4,821,338 A | 4/1989 | Naruse |
| 4,868,719 A | 9/1989 | Kouchi et al. |
| 4,900,970 A | 2/1990 | Ando |
| 4,918,497 A | 4/1990 | Edmond |
| 4,928,084 A | 5/1990 | Reiser |
| 4,929,866 A | 5/1990 | Murata et al. |
| 4,935,665 A | 6/1990 | Murata |
| 4,949,866 A | 8/1990 | Sanders |
| 4,954,822 A | 9/1990 | Borenstein |
| 4,965,644 A | 10/1990 | Kawabata et al. |
| 4,966,862 A | 10/1990 | Edmond |
| 4,975,644 A | 12/1990 | Fox |
| 4,975,814 A | 12/1990 | Schairer |
| 4,990,970 A | 2/1991 | Fuller |
| 5,000,569 A | 3/1991 | Nylund |
| 5,027,168 A | 6/1991 | Edmond |
| 5,035,055 A | 7/1991 | McCullough |
| 5,038,406 A | 8/1991 | Titterton |
| 5,041,947 A | 8/1991 | Yuen et al. |
| 5,045,767 A | 9/1991 | Wakatake |
| 5,050,055 A | 9/1991 | Lindsay et al. |
| 5,057,828 A | 10/1991 | Rousseau |
| 5,060,303 A | 10/1991 | Wilmoth |
| 5,067,788 A | 11/1991 | Jannson et al. |
| 5,091,828 A | 2/1992 | Jincks et al. |
| D324,921 S | 3/1992 | Stanuch et al. |
| 5,093,768 A | 3/1992 | Ohe |
| 5,097,397 A | 3/1992 | Stanuch et al. |
| 5,097,612 A | 3/1992 | Williams |
| 5,101,326 A | 3/1992 | Roney |
| 5,122,943 A | 6/1992 | Pugh |
| 5,136,287 A | 8/1992 | Borenstein |
| 5,159,486 A | 10/1992 | Webb |
| 5,164,992 A | 11/1992 | Turk |
| 5,172,113 A | 12/1992 | Hamer |
| 5,182,647 A | 1/1993 | Chang |
| 5,187,547 A | 2/1993 | Ninna et al. |
| 5,193,201 A | 3/1993 | Tymes |
| 5,198,746 A | 3/1993 | Gyugyi et al. |
| 5,198,756 A | 3/1993 | Jenkins et al. |
| 5,220,235 A | 6/1993 | Wakimizu et al. |
| 5,224,773 A | 7/1993 | Arimura |
| 5,233,204 A | 8/1993 | Fletcher et al. |
| 5,235,498 A | 8/1993 | Van Dulmen et al. |
| 5,283,425 A | 2/1994 | Imamura |
| 5,291,196 A | 3/1994 | Defour |
| 5,296,840 A | 3/1994 | Gieffers |
| 5,298,738 A | 3/1994 | Gebert et al. |
| 5,302,965 A | 4/1994 | Belcher et al. |
| 5,313,187 A | 5/1994 | Choi et al. |
| 5,321,593 A | 6/1994 | Moates |
| 5,357,123 A | 10/1994 | Sugawara |
| 5,357,409 A | 10/1994 | Glatt |
| 5,359,255 A | 10/1994 | Kawai et al. |
| 5,359,669 A | 10/1994 | Shanley et al. |
| 5,361,190 A | 11/1994 | Roberts et al. |
| 5,362,971 A | 11/1994 | McMahon et al. |
| 5,381,155 A | 1/1995 | Gerber |
| 5,400,140 A | 3/1995 | Johnston |
| 5,401,328 A | 3/1995 | Schmitz |
| 5,403,916 A | 4/1995 | Watanabe et al. |
| 5,406,095 A | 4/1995 | Koyama et al. |
| 5,410,328 A | 4/1995 | Yoksza |
| 5,410,453 A | 4/1995 | Ruskouski |
| 5,416,627 A | 5/1995 | Wilmoth |
| 5,419,065 A | 5/1995 | Lin |
| 5,420,444 A | 5/1995 | Sawase et al. |
| 5,422,623 A | 6/1995 | Bader et al. |
| 5,426,417 A | 6/1995 | Stanuch |
| 5,434,693 A | 7/1995 | Tanaka |
| 5,436,809 A | 7/1995 | Brassier et al. |
| 5,450,301 A | 9/1995 | Waltz et al. |
| 5,453,729 A | 9/1995 | Chu |
| 5,465,142 A | 11/1995 | Krumes |
| 5,471,371 A | 11/1995 | Koppolu et al. |
| 5,475,241 A | 12/1995 | Harrah et al. |
| 5,482,896 A | 1/1996 | Tang |
| 5,490,048 A | 2/1996 | Brassier et al. |
| 5,490,049 A | 2/1996 | Montalan et al. |
| 5,491,350 A | 2/1996 | Unno et al. |
| 5,498,883 A | 3/1996 | Lebby et al. |
| 5,514,627 A | 5/1996 | Lowery et al. |
| 5,516,727 A | 5/1996 | Broom |
| 5,519,720 A | 5/1996 | Hirano et al. |
| 5,526,237 A | 6/1996 | Davenport et al. |
| 5,528,474 A | 6/1996 | Roney et al. |
| 5,532,472 A | 7/1996 | Furuta |
| 5,546,219 A * | 8/1996 | Iida ............................... 359/281 |
| 5,546,496 A | 8/1996 | Kimoto et al. |
| 5,552,780 A | 9/1996 | Knockeart |
| 5,557,257 A | 9/1996 | Gieffers |
| 5,567,036 A | 10/1996 | Theobald et al. |
| 5,568,406 A | 10/1996 | Gerber |
| 5,569,939 A | 10/1996 | Choi |
| 5,575,459 A | 11/1996 | Anderson |
| 5,580,156 A | 12/1996 | Suzuki et al. |
| 5,585,783 A | 12/1996 | Hall |
| 5,593,223 A | 1/1997 | Koizumi |
| 5,593,459 A | 1/1997 | Gamblin |
| 5,594,415 A | 1/1997 | Ishikawa |
| 5,598,290 A | 1/1997 | Tanaka |
| 5,604,480 A | 2/1997 | Lamparter |
| 5,606,444 A | 2/1997 | Johnson |
| 5,612,201 A | 3/1997 | DePlaen |
| 5,612,231 A | 3/1997 | Holm |
| 5,625,201 A | 4/1997 | Holm |
| 5,627,851 A | 5/1997 | Takahashi |
| 5,631,474 A | 5/1997 | Saitoh |
| 5,632,551 A | 5/1997 | Roney |
| 5,633,629 A * | 5/1997 | Hochstein ................... 340/907 |
| 5,634,287 A | 6/1997 | Lamparter |
| 5,634,357 A | 6/1997 | Nutter |
| 5,634,711 A | 6/1997 | Kennedy |
| 5,635,902 A | 6/1997 | Hochstein |
| 5,635,981 A | 6/1997 | Ribacoff |
| 5,636,916 A | 6/1997 | Sokolowski |
| 5,643,357 A | 7/1997 | Breton |
| 5,644,291 A | 7/1997 | Jozwik |
| 5,656,829 A | 8/1997 | Sakaguchi |
| 5,660,461 A | 8/1997 | Ignatius |
| 5,661,645 A | 8/1997 | Hochstein |
| 5,661,742 A | 8/1997 | Huang |
| 5,664,448 A | 9/1997 | Swan |
| 5,674,000 A | 10/1997 | Kalley |
| 5,694,112 A | 12/1997 | VannRox |

(56) References Cited

U.S. PATENT DOCUMENTS

| | | | |
|---|---|---|---|
| 5,696,500 A | 12/1997 | Diem | |
| 5,697,175 A | 12/1997 | Schwartz | |
| 5,705,047 A | 1/1998 | Lee | |
| 5,707,891 A | 1/1998 | Izumi | |
| 5,708,428 A | 1/1998 | Phillips | |
| 5,722,760 A | 3/1998 | Chien | |
| 5,726,535 A | 3/1998 | Yan | |
| 5,726,786 A | 3/1998 | Heflinger | |
| 5,734,337 A | 3/1998 | Kupersmit | |
| 5,734,343 A | 3/1998 | Urbish et al. | |
| 5,736,925 A | 4/1998 | Knauff | |
| 5,739,552 A | 4/1998 | Kimura | |
| 5,739,592 A | 4/1998 | Rigsby | |
| 5,758,947 A | 6/1998 | Glatt | |
| 5,760,531 A | 6/1998 | Pederson | |
| 5,781,105 A | 7/1998 | Bitar | |
| 5,785,418 A | 7/1998 | Hochstein | |
| 5,786,918 A | 7/1998 | Suzuki | |
| 5,789,768 A | 8/1998 | Lee | |
| 5,793,062 A | 8/1998 | Kish, Jr. | |
| 5,796,376 A | 8/1998 | Banks | |
| 5,804,822 A | 9/1998 | Brass | |
| 5,805,081 A | 9/1998 | Fikacek | |
| 5,805,209 A | 9/1998 | Yuge et al. | |
| 5,806,965 A | 9/1998 | Deese | |
| 5,808,592 A | 9/1998 | Mizutani | |
| 5,809,161 A | 9/1998 | Auty et al. | |
| 5,809,681 A | 9/1998 | Miyamoto | |
| 5,810,833 A | 9/1998 | Brady | |
| 5,826,965 A | 10/1998 | Lyons | |
| 5,828,055 A | 10/1998 | Jebens | |
| 5,831,155 A | 11/1998 | Hewitt | |
| 5,838,024 A | 11/1998 | Masuda | |
| 5,838,247 A | 11/1998 | Bladowski | |
| 5,838,259 A | 11/1998 | Tonkin | |
| 5,848,837 A | 12/1998 | Gustafson | |
| 5,860,135 A | 1/1999 | Sugita | |
| 5,872,646 A | 2/1999 | Alderman | |
| 5,875,261 A | 2/1999 | Fitzpatrick | |
| 5,884,997 A | 3/1999 | Stanuch | |
| 5,898,381 A | 4/1999 | Gartner | |
| 5,900,850 A | 5/1999 | Bailey | |
| 5,917,637 A | 6/1999 | Ishikawa | |
| 5,929,788 A | 7/1999 | Vukosic | |
| 5,931,562 A | 8/1999 | Arato | |
| 5,931,570 A | 8/1999 | Yamuro | |
| 5,932,860 A | 8/1999 | Plesko | |
| 5,934,694 A | 8/1999 | Schugt | |
| 5,936,417 A | 8/1999 | Nagata | |
| 5,939,996 A | 8/1999 | Kniveton | |
| 5,948,038 A | 9/1999 | Daly et al. | |
| 5,959,752 A | 9/1999 | Ota | |
| 5,960,135 A | 9/1999 | Ozawa | |
| 5,965,879 A | 10/1999 | Leviton | |
| 5,966,073 A | 10/1999 | Walton | |
| 5,975,714 A | 11/1999 | Vetorino | |
| 5,990,802 A | 11/1999 | Maskeny | |
| 5,991,085 A | 11/1999 | Rallison | |
| 6,009,650 A | 1/2000 | Lamparter | |
| 6,014,237 A | 1/2000 | Abeles | |
| 6,018,899 A | 2/2000 | Hanitz | |
| 6,028,694 A | 2/2000 | Schmidt | |
| 6,035,053 A | 3/2000 | Yoshioka et al. | |
| 6,035,055 A | 3/2000 | Wang | |
| 6,035,074 A | 3/2000 | Fujimoto | |
| 6,067,010 A | 5/2000 | Wang | |
| 6,067,011 A | 5/2000 | Leslie | |
| 6,067,018 A | 5/2000 | Skelton et al. | |
| 6,072,893 A | 6/2000 | Luo | |
| 6,081,206 A | 6/2000 | Kielland | |
| 6,081,304 A | 6/2000 | Kuriyama | |
| 6,086,229 A | 7/2000 | Pastrick | |
| 6,091,025 A | 7/2000 | Cotter et al. | |
| 6,094,148 A | 7/2000 | Henry | |
| 6,095,661 A | 8/2000 | Lebens | |
| 6,095,663 A | 8/2000 | Pond | |
| 6,102,696 A | 8/2000 | Osterwalder | |
| 6,106,137 A | 8/2000 | Adams | |
| 6,111,671 A | 8/2000 | Bahuguna | |
| 6,118,388 A | 9/2000 | Morrison | |
| 6,121,898 A | 9/2000 | Moetteli | |
| 6,126,087 A | 10/2000 | Hedger et al. | |
| 6,159,005 A | 12/2000 | Herold | |
| 6,166,496 A | 12/2000 | Lys | |
| 6,177,678 B1 | 1/2001 | Brass | |
| 6,183,100 B1 | 2/2001 | Suckow | |
| 6,243,492 B1 | 6/2001 | Kamei | |
| 6,249,340 B1 | 6/2001 | Jung et al. | |
| 6,268,788 B1 | 7/2001 | Gray | |
| 6,271,814 B1 | 8/2001 | Kaoh | |
| 6,271,815 B1* | 8/2001 | Yang et al. | 345/82 |
| 6,271,913 B1 | 8/2001 | Jung et al. | |
| 6,292,575 B1 | 9/2001 | Bortolussi | |
| 6,293,904 B1 | 9/2001 | Blazey | |
| 6,318,886 B1 | 11/2001 | Stopa | |
| 6,352,358 B1 | 3/2002 | Lieberman | |
| 6,367,949 B1 | 4/2002 | Pederson | |
| 6,369,849 B1 | 4/2002 | Rzyski | |
| 6,377,558 B1* | 4/2002 | Dent | 370/321 |
| 6,380,865 B1 | 4/2002 | Pederson | |
| 6,389,115 B1 | 5/2002 | Swistock | |
| 6,389,155 B2 | 5/2002 | Funayama | |
| 6,396,954 B1 | 5/2002 | Kondo | |
| 6,400,828 B2 | 6/2002 | Covell et al. | |
| 6,411,022 B1 | 6/2002 | Machida | |
| 6,424,269 B1 | 7/2002 | Pederson | |
| 6,461,008 B1 | 10/2002 | Pederson | |
| 6,462,669 B1 | 10/2002 | Pederson | |
| 6,469,631 B1 | 10/2002 | Pederson | |
| 6,472,996 B1 | 10/2002 | Pederson | |
| 6,476,726 B1 | 11/2002 | Pederson | |
| 6,504,487 B1 | 1/2003 | Pederson | |
| 6,532,212 B1* | 3/2003 | Soloway et al. | 370/230 |
| 6,547,410 B1 | 4/2003 | Pederson | |
| 6,548,967 B1 | 4/2003 | Dowling et al. | |
| 6,590,343 B2 | 7/2003 | Pederson | |
| 6,590,502 B1 | 7/2003 | Pederson | |
| 6,600,274 B1 | 7/2003 | Hughes | |
| 6,600,899 B1 | 7/2003 | Radomsky et al. | |
| 6,614,359 B2 | 9/2003 | Pederson | |
| 6,623,151 B2 | 9/2003 | Pederson | |
| 6,683,590 B1 | 1/2004 | Pang et al. | |
| 6,690,294 B1 | 2/2004 | Zierden | |
| 6,693,551 B2 | 2/2004 | Pederson | |
| 6,705,745 B1 | 3/2004 | Pederson | |
| 6,707,389 B2 | 3/2004 | Pederson | |
| 6,788,217 B2 | 9/2004 | Pederson | |
| 6,814,459 B2 | 11/2004 | Pederson | |
| 6,819,654 B2* | 11/2004 | Soloway et al. | 370/238 |
| 6,819,677 B1 | 11/2004 | Nouzovsky et al. | |
| 6,822,578 B2 | 11/2004 | Pederson | |
| 6,844,824 B2 | 1/2005 | Vukosic | |
| 6,879,263 B2* | 4/2005 | Pederson et al. | 340/815.45 |
| 6,892,942 B1 | 5/2005 | Widl | |
| 7,006,768 B1 | 2/2006 | Franklin | |
| 7,023,469 B1 | 4/2006 | Olson | |
| 7,046,160 B2* | 5/2006 | Pederson et al. | 340/815.45 |
| 7,102,665 B1 | 9/2006 | Chandler et al. | |
| 7,103,614 B1 | 9/2006 | Kucik | |
| 7,183,895 B2 | 2/2007 | Bazakos et al. | |
| 7,230,884 B2 | 6/2007 | Shemesh | |
| 7,324,757 B2* | 1/2008 | Wilson et al. | 398/116 |
| 7,439,847 B2 | 10/2008 | Pederson | |
| 7,548,698 B2 | 6/2009 | Yamamoto | |
| 7,557,521 B2 | 7/2009 | Lys | |
| 7,583,901 B2 | 9/2009 | Nakagawa et al. | |
| 7,912,377 B2* | 3/2011 | Koga | 398/172 |
| 8,126,554 B2 | 2/2012 | Kane | |
| 8,175,799 B1* | 5/2012 | Woehler | 701/408 |
| 8,188,878 B2* | 5/2012 | Pederson et al. | 340/815.45 |
| 8,188,879 B2* | 5/2012 | Pederson | 340/815.45 |
| 8,538,692 B2* | 9/2013 | Wurman et al. | 701/532 |
| 8,571,411 B2* | 10/2013 | Pederson et al. | 398/115 |
| 2002/0109892 A1 | 8/2002 | Seto | |

(56) References Cited

U.S. PATENT DOCUMENTS

| | | | |
|---|---|---|---|
| 2003/0025608 A1 | 2/2003 | Pederson | |
| 2003/0118216 A1 | 6/2003 | Goldberg | |
| 2003/0156037 A1 | 8/2003 | Pederson | |
| 2003/0169164 A1 | 9/2003 | Lau | |
| 2003/0185340 A1 | 10/2003 | Frantz | |
| 2003/0212996 A1* | 11/2003 | Wolzien | 725/60 |
| 2003/0222587 A1* | 12/2003 | Dowling et al. | 315/149 |
| 2004/0044709 A1 | 3/2004 | Cabrera et al. | |
| 2004/0151344 A1 | 8/2004 | Farmer et al. | |
| 2004/0153229 A1 | 8/2004 | Gokturk | |
| 2004/0208599 A1 | 10/2004 | Swartz et al. | |
| 2005/0002673 A1* | 1/2005 | Okano et al. | 398/130 |
| 2005/0005794 A1 | 1/2005 | Inukai | |
| 2005/0057941 A1 | 3/2005 | Pederson | |
| 2005/0111700 A1 | 5/2005 | O'Boyle et al. | |
| 2006/0056855 A1* | 3/2006 | Nakagawa et al. | 398/183 |
| 2006/0132382 A1 | 6/2006 | Jannard | |
| 2006/0149813 A1 | 7/2006 | Janik | |
| 2006/0213731 A1* | 9/2006 | Lesesky et al. | 188/158 |
| 2006/0238368 A1* | 10/2006 | Pederson et al. | 340/815.45 |
| 2007/0104239 A1* | 5/2007 | Koga | 372/45.01 |
| 2007/0110446 A1 | 5/2007 | Hong et al. | |
| 2007/0145915 A1 | 6/2007 | Roberge et al. | |
| 2007/0147843 A1* | 6/2007 | Fujiwara | 398/118 |
| 2007/0160373 A1 | 7/2007 | Biegelsen et al. | |
| 2007/0165244 A1* | 7/2007 | Yukhin et al. | 356/603 |
| 2007/0269219 A1* | 11/2007 | Teller et al. | 398/140 |
| 2007/0294029 A1* | 12/2007 | D'Andrea et al. | 701/209 |
| 2008/0044188 A1 | 2/2008 | Kagawa | |
| 2008/0154101 A1 | 6/2008 | Jain et al. | |
| 2008/0227463 A1 | 9/2008 | Hizume et al. | |
| 2009/0129782 A1 | 5/2009 | Pederson | |
| 2009/0157545 A1 | 6/2009 | Mobley | |
| 2012/0202520 A1* | 8/2012 | George | 455/456.1 |
| 2012/0230696 A1* | 9/2012 | Pederson et al. | 398/115 |

FOREIGN PATENT DOCUMENTS

| | | |
|---|---|---|
| CA | 2164920 | 6/1996 |
| DE | 4304216 | 8/1994 |
| DE | 19502735 | 8/1996 |
| DE | 19548639 | 6/1997 |
| DE | 19721673 | 11/1997 |
| DE | 29712281 | 1/1998 |
| EP | 0326668 | 8/1989 |
| EP | 0468822 | 1/1992 |
| EP | 0531184 | 3/1993 |
| EP | 0531185 | 3/1993 |
| EP | 0596782 | 5/1994 |
| EP | 0633163 | 1/1995 |
| EP | 0688696 | 12/1995 |
| EP | 0709818 | 5/1996 |
| EP | 0793403 | 9/1997 |
| EP | 0887783 | 12/1998 |
| EP | 0890894 | 1/1999 |
| EP | 0896898 | 2/1999 |
| EP | 0967590 | 12/1999 |
| EP | 1043189 | 10/2000 |
| EP | 1564914 | 8/2005 |
| FR | 2658024 | 8/1991 |
| FR | 2680861 | 3/1993 |
| FR | 2707222 | 1/1995 |
| FR | 2800500 | 5/2001 |
| GB | 1241369 | 8/1971 |
| GB | 2069257 | 8/1981 |
| GB | 2111270 | 6/1983 |
| GB | 2139340 | 11/1984 |
| GB | 2175428 | 11/1986 |
| GB | 2240650 | 8/1991 |
| GB | 2272791 | 5/1994 |
| GB | 2292450 | 2/1996 |
| GB | 2311401 | 9/1997 |
| GB | 2323618 | 9/1998 |
| GB | 2330679 | 4/1999 |
| GB | 2359179 | 8/2001 |
| GB | 2359180 | 8/2001 |
| JP | 60143150 | 7/1985 |
| JP | 6333403 | 12/1994 |
| JP | 06333403 | 12/1994 |
| JP | 8002341 | 1/1996 |
| JP | 08002341 | 1/1996 |
| JP | 10098778 | 4/1998 |
| WO | 9750070 | 12/1997 |
| WO | 9935634 | 7/1999 |
| WO | 9942985 | 8/1999 |
| WO | 99/49435 | 9/1999 |
| WO | 99/49446 | 9/1999 |
| WO | 0074975 | 12/2000 |
| WO | 0101675 | 1/2001 |
| WO | 0110674 | 2/2001 |
| WO | 0110675 | 2/2001 |
| WO | 0110676 | 2/2001 |
| WO | 02/25842 | 3/2002 |
| WO | 0225842 | 3/2002 |
| WO | 02/073836 | 9/2002 |

OTHER PUBLICATIONS

Kahn et al., "Wireless Infrared Communications," Proceedings of the IEEE, vol. 85, No. 2, Feb. 1997, pp. 265-298.

Jeffrey B. Carruthers, "Wireless Infrared Communications," Wiley Encyclopedia of Telecommunications, 2002.

Akhavan et al., "High-Speed Power-Efficient Indoor Wireless Infrared Communication Using Code Combining-Part I," IEEE Trnsactions on Communications, vol. 50, No. 7, Jul. 2002, pp. 1098-1109.

Djahani et al., "Analysis of Infrared Wireless Links Employing Multibeam Transmitters and Imaging Diversity Receivers," IEEE Transactions on Communications, vol. 48, No. 12, Dec. 2000, pp. 2077-2088.

Hawaiian Electric Company, Inc.: Powerlines—Energy Efficiency Takes-off at Honolulu International Airport, Spring 2008, pp. 1-13.

Pacific Northwest National Laboratory: Demonstration Assement of Light-Emitting Diode (LED) Parking Lot Lighting, Phase 1, Jun. 2010, pp. 1-37.

Van Wicklen, Garrett L.: Using LED Lights Can Reduce Your Electricity Costs, Dec. 2005, Cooperative Extension Service, Applied Poultry Engineering News, vol. 3, No. 1, pp. 1-4.

\* cited by examiner

LED LIGHT DONGLE COMMUNICATION SYSTEM

CROSS-REFERENCE TO RELATED APPLICATIONS

This application claims priority to provisional patent application No. 60/931,611, filed May 24, 2007, the disclosure of which is expressly incorporated herein by reference.

STATEMENT REGARDING FEDERALLY SPONSORED RESEARCH

Not Applicable

FIELD OF THE INVENTION

In some embodiments, the present invention is generally directed to light emitting diodes (LEDs) and applications thereof. In particular, some embodiments of the present invention are directed to using LEDs and LED interface devices in conjunction with power line communication technology to provide internet access and communication capability to residential and commercial clientele.

BACKGROUND OF THE INVENTION

Present communication techniques using wireless communication including radiofrequency transmissions (RF) raise security concerns because transmissions using RF can be easily intercepted, in part because of the fact that RF signals are designed to radiate signals in all directions. Second, radiofrequency transmissions may be regulated by the Federal Communications Commission (FCC) which may control the frequencies that may be used for RF transmission. Third, RF by its very nature is susceptible to interference and produces noise.

In contrast to RF communications, light sources used for communication are extremely secure due to the fact that they are focused within a narrow beam, requiring the placement of equipment within the beam itself for interception. Also, because the visible spectrum is not regulated by the FCC, light sources can be used for communications purposes without the need of a license. Light sources are also not susceptible to interference nor do they produce noise that can interfere with other devices.

Light emitting diodes (LEDs) may be used as light sources to attempt data transmission, as described in U.S. Pat. Nos. 6,879,263 and 7,046,160, the entire contents of each being expressly incorporated herein by reference. LEDs have a quick response to "ON" and "OFF" signals, as compared to the longer warm-up and response times associated with fluorescent lighting, for example. LEDs are efficient in the production of light, as measured in lumens per watt. Recent developments in LED technology, such as high brightness blue LEDs, have paved the way for white LEDs, which have made LEDs a practical alternative to conventional light sources. As such, LED technology provides a practical opportunity to combine lighting and communication. This combination of lighting and communication allows ubiquitous light sources such as street lights, home lighting, and office building lighting, for example, to be converted to, or supplemented with, LED technology to provide for communications while simultaneously producing light for illumination purposes.

In addition to use as general lighting, LEDs can be used in networking applications. In any network, a variety of client devices will communicate with one or more host devices. The host may provide connection to a Local Area Network (LAN), sometimes referred to as an Intranet, owing to the common use of such a network entirely within an office space, building, or business. The host may additionally or alternatively provide connection to a Wide Area Network (WAN), commonly describing a network coupling widely separated physical locations which are connected together through any suitable connection, including for exemplary purposes but not solely limited thereto such means as fiber optic links, T1 lines, Radio Frequency (RF) links including cellular telecommunications links, satellite connections, DSL connections, or even Internet connections. Generally, where mote public means such as the Internet are used, secured access will commonly separate the WAN from general Internet traffic. The host may further provide access to the Internet.

A variety of client devices have heretofore been enabled to connect to host devices. Such client devices may commonly include computing devices of all sorts, ranging from handheld devices such as Personal Digital Assistants (PDAs) to massive mainframe computers, and including Personal Computers (PCs). However, over time many more devices have been enabled for connection to network hosts, including for exemplary purposes printers, network storage devices, cameras, other security and safety devices, appliances, HVAC systems, manufacturing machinery, and so forth. Essentially, any device which incorporates or can be made to incorporate sufficient electronic circuitry may be so linked as a client to a host.

Existing client devices ate designed to connect to host network access points through wired connections, like copper wire, for example, fiber optic connections, or as wireless connections, such as wireless routers. In the case of a wired system, whether through simple wire, twisted wire, co-axial cable, fiber optics or other line or link, the host and client are tethered together through this physical communications channel. The tether, as may be appreciated, limits movement of the client relative to the host, is often unsightly and hard to contain in a workspace, and so may even be or become a tripping hazard. In addition, electrical connectors such as jacks must be provided, and these connectors necessarily limit the number of access points and locations. The installation of connectors defaces walls, sometimes rendering them unsuitable for a particular desired application, and yet they add undesirable installation expense, whether during new construction or in retrofitting an existing building structure.

In contrast, in the case of wireless routers, an RF signal replaces the physical communications channel with a radio channel. This advantageously eliminates the wire or fiber tether between client and host. Instead, client devices in a wireless system try through various broadcasts and signal receptions to find an access point that will have adequate transmission and reception, generally within a certain signal range which may range from a few meters to as many as several tens of meters. The systems are programmed to bridge from a host access point to various client devices through known exchanges of information, commonly described as communications protocols or handshakes. Depending upon the communications channel, a variety of client connection devices are utilized such as PCMCIA or PC cards, serial ports, parallel ports, SIMM cards, USB connectors, Ethernet cards or connectors, firewire interfaces, Bluetooth compatible devices, infrared/IrDA devices, and other known or similar components.

The security of these prior art wireless devices may be compromised in that they are vulnerable to unauthorized access or interception, and the interception may be from a significant distance, extending often well beyond physical building and property boundaries. Moreover, reliability can be hindered by interference from an appliance such as a microwave oven.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. §1.56(a) exists.

All U.S. patents and applications and all other published documents mentioned anywhere in this application are incorporated herein by reference in their entirety.

Without limiting the scope of the invention, a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided for the purposes of complying with 37 C.F.R. §1.72.

GENERAL DESCRIPTION OF THE INVENTION

This application is related to the patent application entitled "LED Light Communication System," patent application Ser. No. 12/126,529, filed contemporaneously herewith, which is incorporated by reference herein in its entirety. The present application is also related to the patent application entitled "Building Illumination Apparatus with Integrated Communications, Security and Energy Management," patent application Ser. No. 12/126,342, filed contemporaneously herewith, which is incorporated herein by reference in its entirety. Also the present application is related to the patent application entitled "LED Light Interior Room and Building Communication System," patent application Ser. No. 12/12,6647, filed contemporaneously herewith, which is incorporated by reference herein it its entirety. Further, the present application is also related to the patent application entitled "Broad Band Over Power Line Communication System," patent application Ser. No. 12/126,469, filed contemporaneously herewith, which is incorporated by reference herein in its entirety. The present application is also related to the patent application entitled "LED Light Global Positioning And Routing Communication System," patent application Ser. No. 12/126,589, filed contemporaneously herewith, which is incorporated by reference in its entirety.

Applicant also incorporates by reference herein patent application Ser. No. 10/646,853, filed Aug. 22, 2003, which claims the benefit of provisional patent application Nos. 60/405,592 and 60/405,379, both filed Aug. 23, 2002, the disclosures of all three being expressly incorporated herein by reference. Applicant also incorporates by reference herein patent application Ser. No. 12/032,908, filed Feb. 18, 2008, which is continuation of patent application Ser. No. 11/433,979, filed May 15, 2006, which is a continuation of patent application Ser. No. 11/102,989, filed Apr. 11, 2005, now issued U.S. Pat. No. 7,046,160, which is a division of patent application Ser. No. 09/993,040, filed Nov. 14, 2001, now issued U.S. Pat. No. 6,879,263, which claims the benefit of provisional patent application No. 60/248,894, filed Nov. 15, 2000, the entire contents of each being expressly incorporated herein by reference.

According to the invention, there is provided a light emitting diode (LED) signal light and systematic information transfer through encrypted pulsed light communication system which may be depicted in several embodiments. In general, the signal light and pulsed light communication system may be formed of a single row, single source, or an array of light emitting diode light sources configured on a light support and in electrical communication with a controller and a power supply, battery, or other electrical source. The signal light and pulsed light communication system may provide various light signals, colored light signals, or combination or patterns of light signals for use in association with the communication of information. These light signals may also be encoded. Additionally, the signal light and pulsed light communication system may be capable of displaying symbols, characters, or arrows. Rotating and oscillating light signals may be produced by sequentially illuminating columns of LED's on a stationary light support in combination with the provision of variable light intensity from the controller. However, the signal light and pulsed light communication system may also be rotated or oscillated via mechanical means. The signal light and pulsed light communication system may also be easily transportable and may be conveniently connected to a device or structure for electrical coupling to a power supply, battery, or other electrical source as a remote stand-alone signaling or communication device.

Individual light supports as a portion of the communication system may be positioned adjacent to, and/or be in electrical communication with another light support, through the use of suitable electrical connections. Alternatively, individual light supports may be in communication with each other exclusively through the transmission and receipt of pulsed light signals.

A plurality of light supports or solitary light sources may be electrically coupled in either a parallel or series manner to a controller. The controller is also preferably in electrical communication with the power supply and the LED's, to regulate or modulate the light intensity for the LED light sources. The individual LED's and/or arrays of LED's may be used for transmission of communication packets formed of light signals.

The controller for the LED light support may generate and/or recognize pulsed light signals used to communicate information. The LED light system may also include a receptor coupled to the controller, where the receptor is constructed and arranged for receipt of pulsed LED light signals for conversion to digital information, and for transfer of the digital information to the controller for analysis and interpretation. The controller may then issue a light signal or other communication signal to an individual to communicate the content of received information transmitted via a pulsed LED light carrier.

In one embodiment of the invention, a Universal Serial Bus (USB) dongle or similar device may be plugged into a laptop computer or other USB-configured device. The dongle, or similar device, allows hardware like laptop computers, printers, or other electronic devices that were not originally designed with an optical XCVR to be easily retrofitted to permit optical communications through transmission and reception of pulsed light signals, as generated by the LED's.

The USB dongle may be small, and may plug into diverse client devices for the purpose of providing data access and communication without mechanically interfering with the placement or use of the client device. The USB dongle sends and receives data signals which may be carried upon an optical transmission. The data signals may originate from and/or are received by a host device through one or more photodetectors.

The USB dongle may include a conversion device, or software performing a conversion function, for placement of a received or generated data signal into a desired format. In addition, the USB dongle may include appropriate buffering, isolation, modulation or amplification circuitry which will provide appropriate voltage and power through drive signal to adequately drive the LED(s) for production of a data-bearing visible light transmission. Exemplary of common transmit circuitry are operational amplifiers (op-amps) and transistor amplifiers.

The USB dongle device will preferably include reception circuitry for receiving data from a data-bearing visible light wave input signal. The data-bearing visible light wave may be detected by one or more light sensors and converted to a data-bearing electrical signal for processing within a USB-user configured device.

The USB dongle is preferably in communication with a host lamp fixture system which is in communication with a host processor. The host lamp fixture replaces conventional stationary (mounted in a particular place) lighting fixtures to provide optical communication between the host and the user device through the USB dongle. The host lamp fixture is preferably constructed and arranged to communicate data through pulsed light transmissions.

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

DETAILED DESCRIPTION OF THE PREFERRED EMBODIMENTS

Figure 1:
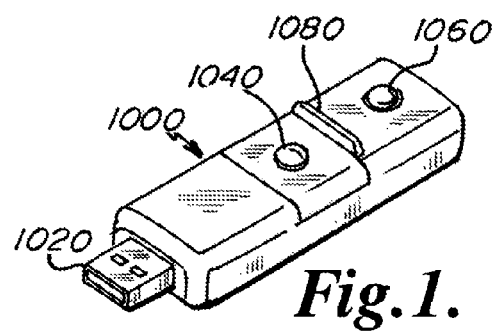
FIG. 1 is isometric view of an embodiment for an LED USB Dongle device.
Figure 2:
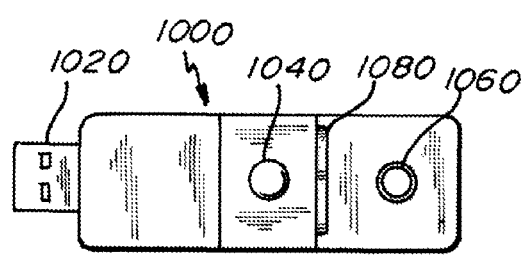
FIG. 2 is a top view of an embodiment of an LED USB Dongle device.
Figure 3:
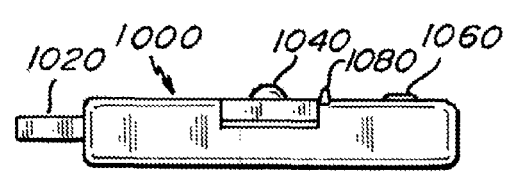
FIG. 3 is a side view of an embodiment of an LED USB Dongle device.
Figure 4:
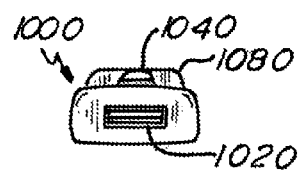
FIG. 4 is an end view of an embodiment of an LED USB Dongle device.

While this invention may be embodied in many different forms, there are described in detail herein specific preferred embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

In one of the embodiments disclosed herein, the controller may regulate and/or modulate the duty cycle for the LED light sources, thereby varying the intensity of the observed light. The controller may be utilized to simultaneously provide modulated or variable light intensity to different and/or independent sections, areas, and/or sectors of a light source.

In one embodiment a server PC may be connected via a USB cable to a server optical transceiver (XCVR), and a client PC may be connected via a USB cable to a client optical transceiver. The server PC is in communication with a network via a CAT-5 cable, for example. The server optical XCVR and the client optical XCVR are substantially similar in at least one embodiment. An exemplary optical XCVR (or, simply, "XCVR") circuit includes one or more LEDs for transmission of light and one or more photodetectors for receiving transmitted light. The term "photodetector" includes "photodiodes" and all other devices capable of converting light into current or voltage. The terms photodetector and photodiode are used interchangeably hereafter. The use of the term photodiode is not intended to restrict embodiments of the invention from using alternative photodetectors that are not specifically mentioned herein.

In at least one embodiment, the XCVR circuit may include an RS232 to USB conversion module. The transmit pin on the USB conversion module drives the driver electronics for the LEDs. In some embodiments, the XCVR circuit includes high intensity LEDs. In some embodiments it may be desirable to use high intensity LEDs to enhance lighting, to improve data transmission, or both. In at least one embodiment, a 12 volt DC, 3 amp power supply is sufficient for powering an array of high intensity LEDs.

In some embodiments, the XCVR circuit further includes an amplifier for amplifying the optical signal received by the photodiode. The output of the amplifier may be fed into level shifting circuitry to raise the signal to TTL levels, for example. The signal is then fed into the receive pin of the RS232 to USB module.

In some embodiments, a 9V battery can be used to power the amplifier circuitry Significant noise is generated by switching high brightness LEDs on and off at 200 mA and 500 kbps, for example. Powering the amplifier with a battery can reduce these noise problems by reducing or removing transients.

It should be noted that in some embodiments, the LED can both emit and receive light. In such an embodiment, the LED can act both as a transmitter or receiver. More information on such bi-directional LEDs can be found in U.S. Pat. No. 7,072, 587, the entire contents of which are expressly incorporated herein by reference.

The XCVR circuit can be a Universal Serial Bus (USB) dongle, such as shown in FIGS. 1-5, or similar device that is plugged into a laptop computer or other USB-configured device. The dongle, or similar device, allows hardware like printers, etc that were not originally designed with an optical XCVR to be easily retrofitted to permit optical communications. As seen in FIGS. 1-5, USB dongle 1000, includes a USB plug 1020 which is in the preferred embodiment most desirably compatible with standard USB connectors found on many devices. USB connectors are found on nearly all recently manufactured printers, PCs, flash drives, portable media players such as MP-3 and video players, and a plethora of other devices. While USB plug 1020 is preferred, owing to the wide availability of USB-enabled client devices, it is contemplated herein that the physical and electrical interface may comprise other standards or alternative constructions. As but one example, an IEEE-1394 (Firewire) interface may be provided alternatively or in addition to USB plug 1020. USB dongle 1000 is in the most prefer red embodiment physically small, such that it may plug into diverse client devices for the purpose of providing data access and communication without mechanically interfering with the placement or use of the client device.

Instead of relying on radio frequencies, USB dongle 1000 communicates through a visible light communications channel. Data signals carried upon an optical transmission are received from a host through photodetector 1040. Data signals are transmitted to the host by LED 1060. Most preferably, photodetector 1040 and LED 1060 are isolated by a visible barrier, which may be a simple protrusion 1080.

Recesses and other optical barriers are further contemplated herein to serve as isolation from emitter-receiver feedback.

Figure 5:
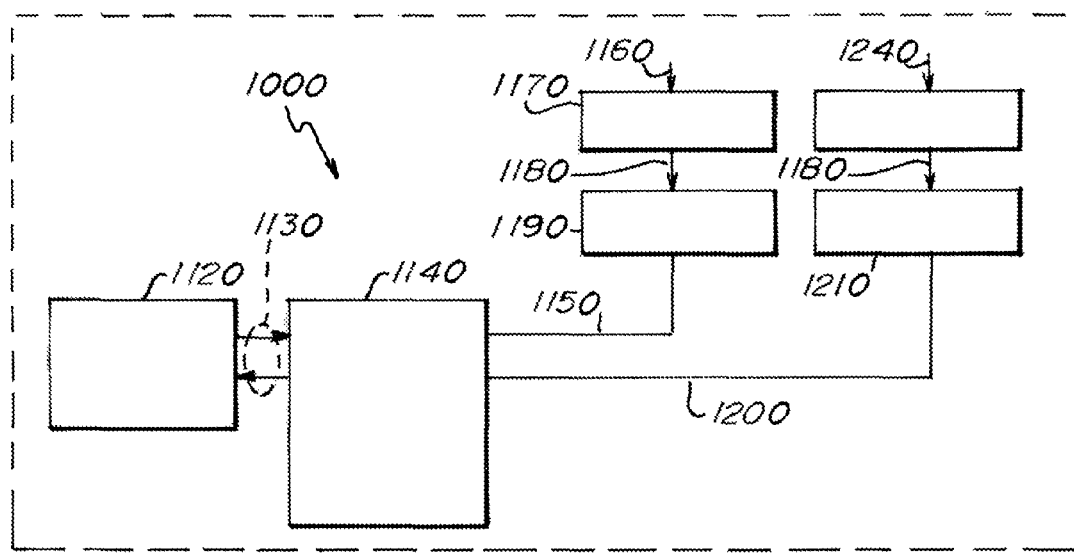
FIG. 5 is a block diagram of an alternative embodiment of the Communication System for an LED USB Dongle device.

USB dongle 1000 is enabled to electrically connect to any client that accepts USB plug 1020, or other connector substituted or provided in addition thereto FIG. 5 illustrates through schematic block diagram an exemplary electrical design of a USB dongle. To be recognized by the client device, the USB dongle will have to obey the electrical and communications specifications for the particular connection type. Consequently, in the preferred embodiment, the USB dongle will comply with both physical and electrical USB specifications through a suitable connection apparatus 1120, allowing connection to a USB host.

The USB-compliant signal 1130 is not, in the preferred embodiment, the preferred signal format for optical transmission or reception. Consequently, transmission of USB-compliant signals 1130 will require conversion through conversion apparatus 1140 to suitable optical transmission format required at transmit signal 1200. For exemplary purposes, if the USB specification uses a differential signaling method using two wires for data, it may be desirable to convert USB-compliant signal 1130 to a different signaling standard, such as a single-ended signaling scheme like the well-known RS-232 standard, which uses a single line for data. Conversion apparatus 1140 will, in accord with the preferred embodiment, be configured to provide the selected electrical conversion. Transmit circuitry 1210 may, in the preferred embodiment, simply be appropriate buffering, isolation, modulation or amplification circuitry which will provide appropriate voltage and power through drive signal 1220 to adequately drive LED 1230 into producing a data-bearing visible light transmission 1240. Exemplary of common transmit circuitry are operational amplifiers (op-amps) and transistor amplifiers, though those skilled in the art of signal conditioning will recognize a plethora of optional circuits and components which might optionally be used in conjunction with the present invention. In one conceived embodiment, the data-bearing visible light transmission may further be modulated, using FM, AM, PWM, PPM, OFDM, QAM or other known modulation techniques.

Similar to the transmission circuitry, USB dongle 1000 also incorporates reception circuitry for receiving data from a data-bearing visible light wave input signal 1160. Data-bearing visible light wave 1160 will be detected by light sensor 1170 and converted to a data-beating electrical signal 1180. Receive circuitry 1190 will appropriately condition, and may further convert data-bearing electrical signal 1180. As but one example of such conversion, receive circuitry 1190 may additionally demodulate data-bearing electrical signal 1180, if the data stream has been modulated by an optical host, and suitable buffering, amplification and other conditioning may be provided to yield a received data signal 1150. Conversion apparatus 1140 will convert received signal 1150 to a USB-compliant signal 1130.

The preferred embodiment USB dongle 1000 uses visible light as the communications channel between client and host, which offers advantage in security, reliability, system testing and configuration, bandwidth, infrastructure, and in other ways. Security is greatly increased because light does not go through walls, in contrast to radio communications, and steps can be taken to obstruct visible transmissions with a much greater certainty than with high frequency radio waves. Furthermore, the visible light may additionally be limited or directed by known optical components such as lenses and reflectors to selectively form beams, as opposed to omni-directional transmissions.

The visible optical link does not interfere with existing communication systems like those that are common today. Consequently, the preferred embodiment may be used in a variety of applications where prior art systems were simply unable due to EMI/RFI considerations.

Set-up, testing, troubleshooting and the like are also vastly simplified. When the light communication system is working, the user can actually see the illumination. If an object interferes with light transmission, the user will again immediately recognize the same. Thus, the ease and convenience of this visible light system adds up to greater mobility and less cost. In addition, relatively high energy outputs may be provided where desired using the preferred visible light communications channel, since the human eye is adapted and well-protected against damage from visible light. In contrast, many invisible transmission techniques such as Ultraviolet (UV) or Infra-Red (IR) systems have much potential for harm.

A host lamp fixture system replaces stationary (mounted in a particular place) lighting fixtures in order to communicate data. Inside of LED lights there may be one or many dies; these may pulsate on slightly different frequencies from a single light to communicate. Each may be looking for changes by way of Multiple Channel Access or other suitable technique.

When a client (such as a laptop) asks for channels, the host tells where the channels can be located. Lights in a ceiling, for example, will communicate with any capable transceiver. One suitable method uses BPL (Broadband over Power Lines) for network connection, taking data and embedding it into a carrier frequency or group like radio, but instead using power lines or wave guides for transmission throughout an existing set of power lines within a building. Thus, a building needs to be wired only for lights, saving a huge infrastructure of other wires and fixtures, saving a great deal of money.

In at least one embodiment, the optical XCVRs, or circuitry attached thereto, include modulation circuitry for modulating a carrier signal with the optical signal. Modulation can be used to eliminate bias conditions caused by sunlight or other interfering light sources. Digital modulation can be accomplished by using phase-shift keying, amplitude-shift keying, frequency-shift keying, quadrature modulation, or any other digital modulation technique known by those of ordinary skill. Similarly, such XCVRs can include demodulation circuitry that extracts the data from the received signal. Some modulation and demodulation techniques for modulating light signals are described in U.S. Pat. Nos. 4,732,310, 5,245,681, and 6,137,613, the entire contents of each being expressly incorporated herein by reference.

It may be desirable in some embodiments to further include filters or filter circuitry to prevent unwanted light from being amplified. For example, the optical baseband signal can be modulated at 100 kHz and then transmitted. The XCVR that receives the 100 kHz modulated signal can include a filter stage centered at 100 kHz. The filtered 100 kHz signal can then be input into the amplifier circuitry, thereby preventing amplification of unwanted signals. In some embodiments, it can be desirable to amplify the transmitted signal first, and then filter out the baseband signal.

Additional information regarding data communication can be found in International Publication Number WO 99/49435, the entire contents of which are expressly incorporated herein by reference.

In one embodiment of the present invention a user device equipped with a USB dongle may be in communication with a system incorporating the use of broadband over power line (BOPL) communications system. Techniques for transmitting data signals over power lines can be found in U.S. Pat.

No. 7,349,325, the entire disclosure of which is expressly incorporated herein by reference.

In some embodiments, an optical XCVR light fixture provides lighting for one or more rooms on the customer premises. In operative communication with the optical XCVR is a power line bridge that demodulates the signal from the electrical power that supplies power to AC/DC converter that supplies power to the LED array of the XCVR. The power line bridge sends the demodulated signal to the optical XCVR for transmission. The USB dongle in turn is in optical communication with the XCVR enabling communication from a host through the Broadband over power line network, then through the power bridge, and finally optically from the XCVR to a user device.

It can be desirable, however, to modulate the light signal prior to transmission to reduce the effects of external lighting. Such an embodiment can be desirable because each room at a customer premise can be either be designed for or retrofitted with optical XCVRs in the ceiling, for example, for lighting. As such, the main light source in the room doubles as an optical link for electronic equipment. Because the optical XCVRs are located in the ceiling, there are few items that can block the light signal.

Injecting the signal onto the electrical wiring and providing an optical link through LED lighting is advantageous over wireless DSL modems. Often times, metal shelving or other structures on the premises interfere with or even block RF signals, thereby requiting multiple access points. However, providing an optical link through LED lighting in each room, for example, inherently provides multiple access points.

In some embodiments, a variety of physical and electrical configurations are contemplated herein for LED light fixture. The LED light fixture may replace a standard fluorescent tube light fixture. This can be accomplished by replacing the entire fixture such that ballasts and other devices specific to fluorescent lighting are replaced. In many cases, this will be the preferred approach. The fixture may then be wired for any suitable or desired voltage, and where a voltage or current different from standard line voltage is used, transformers or power converter s or power supplies may be provided. When a building is either initially being constructed, or so thoroughly remodeled to provide adequate replacement of wires, the voltage may be generated in transformers that may even be provided outside of the occupied space, such as on the roof, in a utility room, basement or attic. In addition to other benefit, placement in these locations will further reduce requirements for air conditioning.

As efficiencies of light generation by LEDs are now beginning to surpass fluorescent tubes, such entire replacement is more economical. However, total replacement of such fixtures is not the only means contemplated herein. Any lesser degree of replacement is also considered in alternative embodiments. For exemplary purposes, the physical reflectors commonly associated with fluorescent fixtures may be preserved, and the fixture simply rewired to bypass any ballasts or starter circuitry that might be present. In this case, line voltage, such as 120VAC at 60 Hertz in the United States, may pass through the electrical connector pins.

Where other types of fixtures already exist, such as standard incandescent Edison screw bases, LED bulbs may similarly accommodate the fixture. For incandescent replacement, no rewiring or removal of ballasts is required, since line voltage is applied directly to incandescent fixtures. Consequently, appropriate conversion may in one conceived alternative embodiment simply involve the replacement of a bulb with no fixture or wiring alterations.

In accord with a preferred method of the invention, LEDs are used to transmit through optical communication channel several kinds of data, including identity, location, audio and video information. The use of an optical communications link provides large available bandwidth, which in turn permits multiple feeds of personal communication between LED light sources and devices utilizing a USB dongle communication interface which may be similar to or in excess of that of cell phones. The optical data is transferred at rates fat in excess of those detectable by the human eye, and so a person is not able to detect any visible changes as the data is being transferred. Additionally, because optical illumination is constrained by opaque objects such as walls, the location of a user device having a USB dongle can be discerned to a particular room, hallway or other similar space.

In some embodiments, an optical signal amplifier is in communication with the photodetectors to increase the signal strength of the received light signals. In at least one embodiment, the LEDs are in operative communication with an LED power driver, ensuring a constant current source for the LEDs.

Within the disclosure provided herein, the term "processor" refers to a processor, controller, microprocessor, microcontroller, mainframe computer or server, or any other device that can execute instructions, perform arithmetic and logic functions, access and write to memory, interface with peripheral devices, etc.

As described herein each, optical XCVR may also include non-volatile memory (FLASHRAM, EEPROM, and EPROM, for example) that may store firmware for the optical XCVR, as well as text information, audio signals, video signals, contact information for other users, etc, as is common with current cell phones.

In some embodiments, an optical signal amplifier is in communication with the photodiodes to increase the signal strength of the received light signals. In at least one embodiment, the LEDs are in operative communication with an LED power driver, ensuring a constant current source for the LEDs.

In addition to being directed to the embodiments described above and claimed below, the present invention is further directed to embodiments having different combinations of the features described above and claimed below. As such, the invention is also directed to other embodiments having any other possible combination of the dependent features claimed below.

Another embodiment of the present invention incorporates Global Positioning System (GPS) information into the data packet to be sent. The Global Positioning System is described in U.S. Pat. No. 4,785,463, the entire contents of which are expressly incorporated herein by reference. GPS positioning uses one or more coordinate systems, such as World Geodetic System 1984 (WGS84), to provide a reference frame, allowing every point on earth to be coded with a unique GPS location.

A data packet may include GPS location header bits that include the packet's destination address in GPS coordinates. The data packet may further include GPS location trailer bits that include the packet's origin address in GPS coordinates. The data packet may further include the address in GPS coordinates of the server optical transceiver (XCVR) that most recently transmitted the packet (the last known transmission address, or LTA), as will be described in more detail below. The data packet further includes the data to be transmitted, and may include any other bits of information determined to be necessary for successful transmission of data, such as error detection bits, as understood by a person of ordinary skill in the art.

Routing data packets from one location to another location can be accomplished using GPS location information tags data packets having a geographic location instead of a cyber location. Such an embodiment eliminates the need for any later geographic location translation because a data packet starts with geographic source and destination information. This simplifies locating the destination of the data packet.

In some embodiments, each data packet is assigned a GPS origin/destination address as it passes through the network infrastructure. The data packet is always searching for the next closest GPS address location. Each stationary (or static) optical XCVR, and some dynamic optical XCVRs, within a network will be designated with a GPS location number. As a data packet passes through the network, it is routed by the optical XCVRs, with their internal processors, to the next physically closer optical XCVR within the network. If another optical XCVR is within receiving range, or is connected with another form of communication medium, that optical XCVR receives the data packet. The optical XCVR's internal processor compares its internal GPS location address (ILA) to the data packet's GPS destination address and the optical XCVR's last known transmission address (LTA) stored within the data packet. If the ILA code is closer to the data packet destination address than the LTA code stored within the data packet, the optical XCVR's processor inserts its ILA code into the data packet as the new LTA code and then repeats transmission of the entire data packet with the updated LTA code.

The network continues this process until the data packet reaches the destination optical XCVR, at which point the data packet is transmitted. If a piece of the infrastructure is missing, the packet will be rerouted to the next nearest optical XCVR and continue until it finds the shortest pathway through the network to the destination address.

This means that each user on the network may declare one or more static positions and also have a dynamic position. A static address may be a home, an office, etc. When a user leaves their static address location to move through the network infrastructure, the user then becomes dynamic. The network may track the user as the user passes optical XCVRs, similar to that of cell phones in relation to cell phone towers, and provide a dynamic address location. If a data packet begins with a destination address that is the user's static address, the network may update the packet with the user's new dynamic address and reroute the packet accordingly, in a scheme similar to that of cellular phones.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

What is claimed is:

1. A light emitting diode (LED) light communication device comprising:
    a housing;
    at least one optical transceiver comprising at least one LED and at least one photodetector, wherein the at least one LED and the at least one photodetector are isolated from emitter-receiver feedback; and
    a universal serial bus interface in communication with said at least one optical transceiver,
    said optical transceiver being constructed and arranged for engagement to, and communication with, an electronic device,
    said optical transceiver being further constructed and arranged for transmission of at least one transmitted light signal and receipt of at least one received light signal,
    said at least one transmitted light signal and said at least one received light signal being observable to the unaided eyes of an individual,
    said at least one received light signal being observable to the unaided eyes of said individual as illumination,
    said at least one transmitted light signal and said at least one received light signal each comprising a plurality of rapid flashes of light, said rapid flashes of light having a frequency which is not observable to the unaided eyes of said individual, wherein said rapid flashes of light are configured for transmission of information or data said information or data comprising at least one optical transceiver location identifier and at least one destination optical transceiver location identifier.

2. The LED light communication device of claim 1, said optical transceiver further comprising a converter.

3. The LED light communication device of claim 2, said optical transceiver further comprising buffering circuitry.

4. The LED light communication device of claim 3, said optical transceiver further comprising isolation circuitry.

5. The LED light communication device of claim 4, said optical transceiver further comprising modulation circuitry.

6. The LED light communication device of claim 4, said optical transceiver further comprising amplification circuitry.

7. The LED light communication device of claim 1, said information or data comprising global positioning system information.

8. The LED light communication device of claim 1, said information or data comprising at least one intermediate optical transceiver location identifier.

9. A light emitting diode (LED) light communication device comprising:
- a housing;
- at least one optical transceiver comprising at least one LED and at least one photodetector, wherein the at least one LED and the at least one photodetector are isolated from emitter-receiver feedback; and
- a universal serial bus interface in communication with said at least one optical transceiver,
- said optical transceiver being constructed and arranged for engagement to, and communication with, an electronic device,
- said optical transceiver being further constructed and arranged for transmission of at least one transmitted light signal and receipt of at least one received light signal,
- said at least one transmitted light signal and said at least one received light signal being observable to the unaided eyes of an individual,
- said at least one received light signal providing light as illumination for a space,
- said at least one transmitted light signal and said at least one received light signal each comprising a plurality of rapid flashes of light said rapid flashes of light having a wavelength in the observable spectrum for the unaided eyes of an individual, said rapid flashes of light having a frequency which is not observable to the unaided eyes of said individual, wherein said rapid flashes of light are configured for transmission of information or data said information or data comprising at least one optical transceiver location identifier and at least one destination optical transceiver location identifier.

* * * * *